US010060254B2

(12) United States Patent
Roberson

(10) Patent No.: US 10,060,254 B2
(45) Date of Patent: Aug. 28, 2018

(54) DOWNHOLE COMMUNICATIONS USING SELECTABLE MODULATION TECHNIQUES

(71) Applicant: Halliburton Energy Services, Inc., Houston, TX (US)

(72) Inventor: Mark W. Roberson, Cary, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/541,620

(22) PCT Filed: Mar. 11, 2015

(86) PCT No.: PCT/US2015/019842
§ 371 (c)(1),
(2) Date: Jul. 5, 2017

(87) PCT Pub. No.: WO2016/144340
PCT Pub. Date: Sep. 15, 2016

(65) Prior Publication Data
US 2017/0342825 A1 Nov. 30, 2017

(51) Int. Cl.
G01V 3/00 (2006.01)
E21B 47/12 (2012.01)
E21B 49/00 (2006.01)
E21B 49/08 (2006.01)
H04L 27/00 (2006.01)

(52) U.S. Cl.
CPC .............. *E21B 47/12* (2013.01); *E21B 49/00* (2013.01); *E21B 49/08* (2013.01); *H04L 27/0008* (2013.01)

(58) Field of Classification Search
None
See application file for complete search history.

(56) References Cited

U.S. PATENT DOCUMENTS

| 4,390,975 A | 6/1983 | Shawhan |
| 5,148,408 A | 9/1992 | Matthews |
| 2008/0030365 A1 | 2/2008 | Fripp et al. |
| 2010/0177596 A1 | 7/2010 | Fink et al. |
| 2010/0194586 A1* | 8/2010 | Tjhang ................. G01V 11/002 340/854.7 |

(Continued)

FOREIGN PATENT DOCUMENTS

| WO | 2011019351 A1 | 2/2011 |
| WO | 2014100272 | 6/2014 |

OTHER PUBLICATIONS

International Patent Application No. PCT/US2015/019842, "International Search Report and Written Opinion", dated Oct. 14, 2015, 18 pages.

*Primary Examiner* — Thomas McCormack
(74) *Attorney, Agent, or Firm* — Kilpatrick Townsend & Stockton LLP

(57) ABSTRACT

A system that is positionable in a wellbore in a subterranean formation can include a first transceiver that is positionable external to a casing string in the wellbore. The first transceiver can wirelessly transmit data using a modulation technique that is selected from among multiple modulation techniques based on a fluid property of a fluid in the wellbore and a property of the subterranean formation. The system can also include a second transceiver that is positionable in the wellbore and operable to receive the data.

18 Claims, 6 Drawing Sheets

(56) References Cited

U.S. PATENT DOCUMENTS

2012/0013893 A1 1/2012 Maida et al.
2014/0246237 A1 9/2014 Prammer
2016/0003035 A1* 1/2016 Logan .................... E21B 47/12
340/854.6

* cited by examiner

DOWNHOLE COMMUNICATIONS USING SELECTABLE MODULATION TECHNIQUES

CROSS-REFERENCE TO RELATED APPLICATIONS

This is a U.S. national phase under 35 U.S.C. 371 of International Patent Application No. PCT/US2015/019842 entitled "Downhole Communications Using Selectable Modulation Techniques" and filed Mar. 11, 2015, the entirety of which is incorporated herein by reference.

TECHNICAL FIELD

The present disclosure relates generally to devices for use in well systems. More specifically, but not by way of limitation, this disclosure relates to downhole communications using selectable modulation techniques.

BACKGROUND

A well system (e.g., an oil or gas well for extracting fluid or gas from a subterranean formation) can include various sensors. For example, a well system can include sensors for measuring well system parameters, such as temperature, pressure, resistivity, or sound levels. In some examples, the sensors can transmit data via cables to a well operator (e.g., typically at the surface of the well system). Cables can wear or fail, however, due to the harsh downhole environment or impacts with well tools. It can be challenging to communicate data from the sensors to the well surface efficiently.

DETAILED DESCRIPTION

Figure 1:
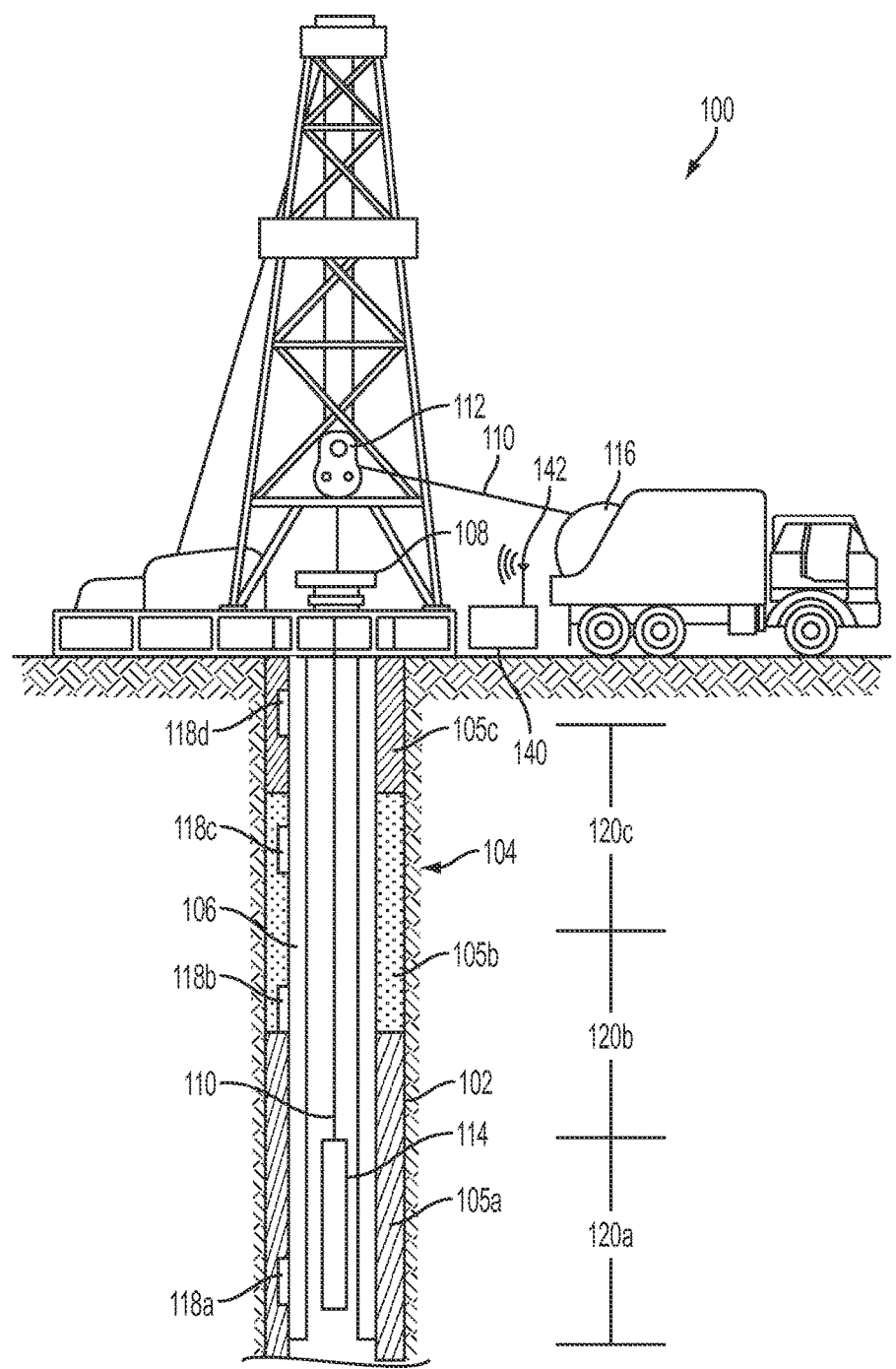
FIG. 1 is a cross-sectional view of an example of a well system that includes a system for downhole communications using selectable modulation techniques.

Certain aspects and features of the present disclosure are directed to downhole communications using selectable modulation techniques. The downhole communications can be wireless communications (e.g., acoustic, ultrasonic, pressure wave, magnetic, electrical, and/or radio frequency communications) between a transceiver positioned external to a casing string in a wellbore and a receiver (e.g., another transceiver or a computing device positioned in the well system). A transceiver can be positioned external to the casing string if it is positioned on or external to an outer diameter or outer wall of the casing string.

The transceiver can transmit data to the receiver using a modulation technique that is selected from among multiple available modulation techniques. Examples of the available modulation techniques can include amplitude keying, amplitude-shift keying, frequency-shift keying, frequency modulation, phase modulation, phase-shift keying, quadrature amplitude modulation, orthogonal frequency-division multiplexing, and single-sideband modulation. In some examples, the transceiver can select a modulation technique from among the available modulation techniques based on a property of a fluid in the wellbore, a property of a subterranean formation (out of which the wellbore is drilled), or both.

In some examples, the transceiver can include a sensor. For example, the transceiver can include a resistivity sensor for detecting a conductivity of the fluid. As another example, the transceiver can include a fluid sensor for detecting a location, direction, and type of the fluid. The sensors can transmit sensor data to the transceiver. The transceiver can use the sensor data to determine the property of the fluid, the property of the subterranean formation, or both.

In one example, the transceiver can be preprogrammed to transmit data using quadrature amplitude modulation by default. Wireless communications using quadrature amplitude modulation can have a higher wireless communication efficiency than wireless communications that use other modulation techniques. Wireless communications using quadrature amplitude modulation, however, can become unstable and attenuated if transmitted through a liquid. In some examples, if the transceiver detects (via a sensor) a liquid between the transceiver and the receiver, the transceiver may select a modulation technique other than quadrature amplitude modulation to transmit data. For example, the transceiver can select amplitude keying. This may reduce instability and improve the efficiency of wireless communications between the transceiver and the receiver.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes a system for downhole communications using selectable modulation techniques. The well system 100 includes a wellbore extending through various earth strata. The wellbore extends through a hydrocarbon bearing subterranean formation 104. In some examples, the subterranean formation 104 can include multiple formation layers 120*a-c*. Each formation layer 120*a-c* can include material that is different from or the same as an immediately adjacent formation layer. For example, formation layer 120*a* can include rock (such as a porous sedimentary rock), formation layer 120*b* can include a hydrocarbon, and formation layer 120*c* can include sand or dirt.

A casing string 106 extends from the surface 108 to the subterranean formation 104. The casing string 106 can provide a conduit through which formation fluids, such as production fluids produced from the subterranean formation 104, can travel from the wellbore 102 to the surface 108.

In some examples, fluids 105a-c (e.g., liquids or gasses) can be positioned into the wellbore. The fluids 105a-c can include cement. A well operator can pump the fluid 105a into an annulus space between the casing string 106 and a wall of the wellbore. In some examples, the fluid 105a can harden or change physical state (e.g., from a fluid to a solid). For example, if the fluid 105a includes cement, the cement can cure and couple the casing string 106 to the wall of the wellbore.

The well system 100 can also include at least one well tool 114 (e.g., a formation-testing tool). The well tool 114 can be coupled to a wireline 110, slickline, or coiled tubing that can be deployed into the wellbore 102. The wireline 110, slickline, or coiled tubing can be guided into the wellbore 102 using, for example, a guide 112 or winch. In some examples, the wireline 110, slickline, or coiled tubing can be wound around a reel 116.

The well system 100 can include a computing device 140. The computing device 140 can be positioned at the surface 108, below ground, or offsite. The computing device 140 can include a processor interfaced with other hardware via a bus. A memory, which can include any suitable tangible (and non-transitory) computer-readable medium, such as RAM, ROM, EEPROM, or the like, can embody program components that configure operation of the computing device 140. In some aspects, the computing device 140 can include input/output interface components (e.g., a display, keyboard, touch-sensitive surface, and mouse) and additional storage.

The computing device 140 can include a communication device 142. The communication device 142 can represent one or more of any components that facilitate a network connection. In the example shown in FIG. 1, the communication device 142 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication device 142 can use acoustic waves, mud pulses, surface waves, vibrations, optical waves, or induction (e.g., magnetic induction) for engaging in wireless communications. In other examples, the communication device 142 can be wired and can include interfaces such as Ethernet, USB, IEEE 1394, or a fiber optic interface.

The well system 100 can also include transceivers 118a-d. In some examples, each of the transceivers 118a-d can be positioned on, partially embedded within, or fully embedded within the casing string 106, the cement sheath 105, or both. In some examples, one or more of the transceivers 118a-d can be positioned internal to (e.g., within an inner diameter of) the casing string 106. In other examples, one or more of the transceivers 118a-d can be positioned externally to the casing string 106. For example, the transceivers 118a-d can be positioned on an outer housing of the casing string 106, within the cement sheath 105, within the subterranean formation 104, or any combination of these. Positioning the transceivers 118a-d externally to the casing string 106 can be advantageous over positioning the transceivers 118a-d elsewhere in the well system 100, such as within the casing string 106, which can affect a drift diameter of the casing string 106. Additionally, positioning the transceivers 118a-d externally to the casing string 106 can allow the transceivers 118a-d to more accurately and efficiently detect characteristics of the subterranean formation 104, the cement sheath 105, and the casing string 106.

The transceivers 118a-d can wirelessly communicate with one another and the computing device 140. The transceivers 118a-d can wirelessly communicate using, for example, acoustic waves, ultrasonic waves, pressure waves, magnetic fields, electrical fields, and/or radio-frequency signals. Each of the transceivers 118a-d can include a communications interface (e.g., described in further detail with respect to FIG. 3). The communications interface can be substantially similar to the communication device 142 associated with the computing device 140.

In some examples, the transceivers 118a-d can wirelessly communicate data in segments or "hops" to a destination (e.g., uphole or downhole). For example, a transceiver 118a can transmit data to another transceiver 118b (e.g., positioned farther uphole), which can relay the data to still another transceiver 118c (e.g., positioned even farther uphole), and so on. As another example, one transceiver 118c can transmit data to another transceiver 118d, which can relay the data to a destination (e.g., the computing device 140).

In some examples, each of the transceivers 118a-d can select a wireless modulation technique from among multiple available modulation techniques. The transceivers 118a-d can select the modulation technique based on a property of a fluid 105a-c (e.g., cement, mud, or a hydrocarbon) in the wellbore 102, a property of the subterranean formation 104 (e.g., a formation layer 120a-c), or both. Examples of the available modulation techniques can include amplitude keying, amplitude-shift keying, frequency-shift keying, frequency modulation, phase modulation, phase-shift keying, quadrature amplitude modulation, orthogonal frequency-division multiplexing, and single-sideband modulation. For example, transceiver 118a can determine (e.g., using a sensor) that there is a liquid between transceiver 118a and transceiver 118b, which may render a particular modulation technique unstable. Transceiver 118a can select a more stable modulation technique, which can improve the efficiency of the wireless communications.

In some examples, at least two of the transceivers 118a-d can use different modulation techniques to transmit data. For example, transceiver 118a can transmit data to transceiver 118b using amplitude keying and transceiver 118b can transmit data to transceiver 118c using a frequency modulation. In some examples, the transceivers 118a-c may select different transmission modes based on the different communication mediums (e.g., the different fluids 105a-c, formation layers 120a-c, or both) through which a wireless signal will travel.

Figure 2:
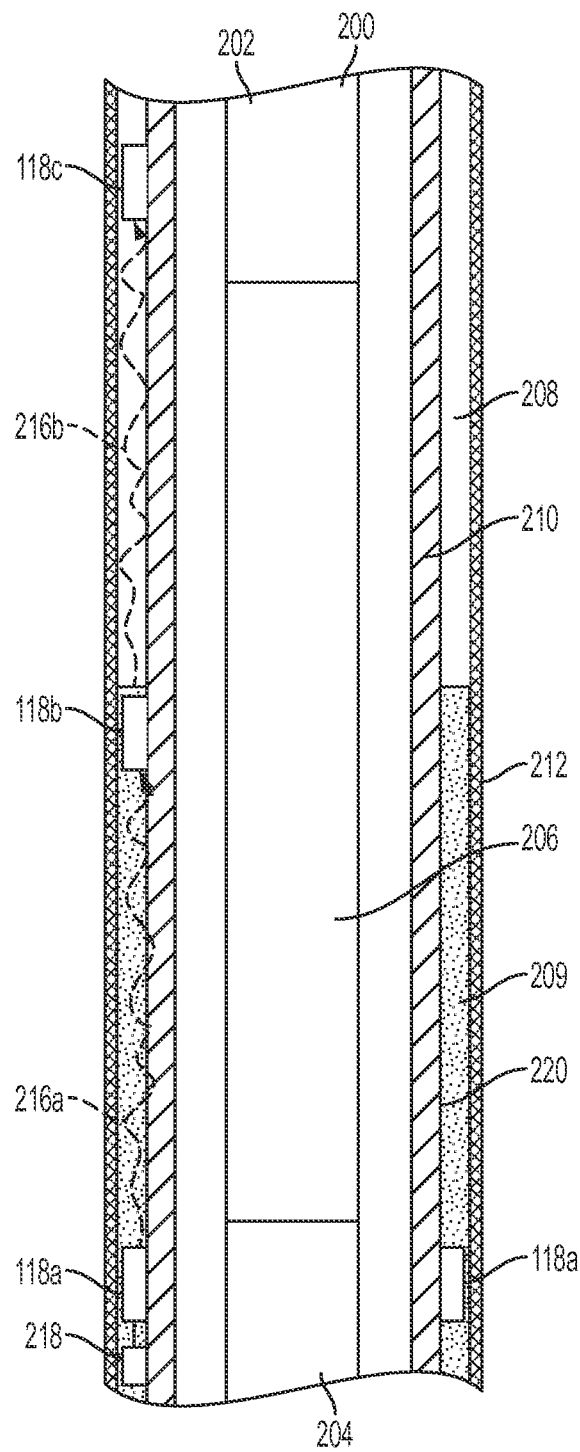
FIG. 2 is a cross-sectional side view of an example of part of a well system that includes a system for downhole communications using selectable modulation techniques that includes transceivers.

FIG. 2 is a cross-sectional side view of an example of part of a well system that includes a system for downhole communications using selectable modulation techniques that includes transceivers 118a-c. The transceivers 118a-c can be positioned on, internally to, or externally to a casing string 210 in a wellbore. For example, the transceiver 118a can be positioned coaxially around an outer housing 220 of the casing string 210. In some examples, a well tool 200 can be positioned within the casing string 210. The well tool 200 can include multiple subsystems 202, 204, 206.

Fluid 209 (e.g., a liquid or gas) can be positioned in a space 208 between the casing string 210 to the subterranean formation 212. Examples of the fluid 209 can include cement, mud, a spacing fluid, a servicing fluid, a hydrocarbon, or any combination of these. In one example, a fluid 209 containing cement can be pumped into the space 208 during cementing operations. The fluid 209, however, may not fill the full longitudinal length of the space 208. This can generate an annulus (e.g., space 208) between a portion of the casing string 210 and the subterranean formation 212. Gas or other material can be positioned in the annulus.

In some examples, each transceiver 118a can include or be electrically coupled to a sensor 218. In the example shown in FIG. 2, the transceiver 118a is electrically coupled to the sensor 218 by a wire. Examples of the sensor 218 can include a pressure sensor, an electromagnetic sensor, a temperature sensor, an acoustic sensor, an accelerometer, a depth sensor, a resistivity sensor, a vibration sensor, an ultrasonic transducer, a fluid analyzer or detector, and a RFID reader. In some examples, the sensor 218 can detect the presence of, absence of, or a characteristic (e.g., the type, location, and conductivity) of the fluid 209. The sensor 218 can additionally or alternatively detect a characteristic (e.g., the type and conductivity) of a portion of the subterranean formation 212 (e.g., a formation layer).

In some examples, the sensor 218 can transmit sensor signals to a processor (e.g., associated with a transceiver 118a). The sensor signals can be representative of sensor data. The processor can receive the sensor signals and cause the transceiver 118a to communicate the sensor data (e.g., to another transceiver 118b). For example, the processor can transmit signals to an antenna (e.g., a toroid antenna or a solenoid antenna) to generate a wireless signal 216a representative of the sensor data. In some examples, the sensor 218 can additionally or alternatively transmit sensor signals to an electrical circuit. The electrical circuit can include modulators, demodulators, operational amplifiers, integrated circuits, filters, frequency shifters, capacitors, multiplexers, an electrical-to-optical converter, inductors, and other electrical circuit components. The electrical circuit can receive the sensor signal and perform one or more functions (e.g., amplification, frequency shifting, modulation, multiplexing, filtering, conversion of electrical signals to optical pulses, analog-to-digital conversion, or digital-to-analog conversion) to cause the transceiver 118a to generate the wireless signal 216a. For example, the electrical circuit can amplify and modulate the sensor signal, and transmit the amplified and modulated signal to an antenna. This can cause the antenna to generate a modulated wireless communication that is representative of the sensor signals.

Each of the transceivers 118a-c can select a modulation technique from among multiple available modulation techniques for use in wirelessly communicating data (e.g., sensor data). Examples of the available modulation techniques can include amplitude keying, amplitude-shift keying, frequency-shift keying, frequency modulation, phase modulation, phase-shift keying, quadrature amplitude modulation, orthogonal frequency-division multiplexing, and single-sideband modulation.

Amplitude keying (sometimes referred to as "on-off keying") can include representing data as a presence or absence of a carrier wave. For example, the presence of a carrier wave for a particular duration can represent a binary one, and the absence of the carrier wave can represent a binary zero. Amplitude-shift keying can include assigning values (e.g., bit values) to discrete amplitude levels of a carrier wave. For example, one amplitude of the carrier wave can be assigned one bit value and another amplitude of the carrier wave can be assigned another bit value. The carrier wave can be modulated among the discrete amplitude levels to transmit information. Frequency-shift keying can include assigning values (e.g., bit values) to discreet changes in the frequency of a carrier wave. For example, one frequency of the carrier wave can be assigned one bit value (e.g., binary 0) and another frequency of the carrier wave can be assigned another bit value (e.g., binary 1). The carrier wave can be modulated among the discrete frequencies to transmit information.

Frequency modulation can include encoding information in carrier wave by varying the instantaneous frequency of the carrier wave. Phase modulation can include encoding information in a carrier wave by varying the instantaneous phase of the carrier wave. Phase-shift keying can include assigning values to discreet phases of a carrier wave. For example, a phase of 0 degrees can be assigned one bit value (e.g., binary 0) and a phase of 90 degrees can be assigned another bit value (e.g., binary 1). The carrier wave can be modulated among the discrete phases to transmit information.

Quadrature amplitude modulation can include changing (e.g., modulating or keying) the amplitude of two carrier waves that are 90 degrees out of phase with one another to transmit information. Single-sideband modulation can be a form of amplitude modulation in which a sideband of a carrier wave is removed or reduced. Orthogonal frequency-division multiplexing can include encoding data on multiple sub-carrier waves. The sub-carrier waves can be orthogonal to each other. Each sub-carrier wave can be modulated using any of the modulation techniques described above (e.g., phase-shift keying).

In some examples, a modulation technique can transmit data via a carrier wave that has a frequency between 100 Hz and 10 MHz. For example, the carrier wave can have a frequency of 700 KHz. In some examples, the modulation rate can be between 1 Hz and 1 MHz. For example, the modulation rate can be 50 KHz.

In some examples, each of the transceivers 118a-c can select a modulation technique based on a property of a fluid 209 in the wellbore, a property of the subterranean formation 212, or both. Examples of the property of the fluid 209 can include a type, conductivity, and location of the fluid 209. Examples of the property of the subterranean formation 212 can include a type and conductivity of a portion of the subterranean formation. In some examples, the sensor 218 can detect the property of the fluid 209 and/or the property of the subterranean formation 212 and transmit associated sensor data to a transceiver 118a. The transceiver 118a can receive the sensor data and select a modulation technique based on the sensor data.

In some examples, selecting a modulation technique based on a property of the fluid 209 and/or subterranean formation 212 can improve the transmission efficiency of wireless communications between transceivers 118a-c. For example, the transceiver 118a can determine (based on sensor data) that a liquid (e.g., fluid 209) is positioned between the transceivers 118a-b based on data from the sensor 218. In some examples, wireless communications using certain modulation techniques can become unstable if transmitted through a liquid. For example, wireless communications using quadrature amplitude modulation can become unstable or attenuate if transmitted through a liquid. In some examples, upon detecting the liquid positioned between the transceivers 118a-b, the transceiver 118a may select a modulation technique other than quadrature amplitude modulation. For example, the transceiver 118a can select amplitude keying, which can have a lower wireless communication efficiency than quadrature amplitude modulation but can be more robust that quadrature amplitude modulation. The transceiver 118a can transmit a wireless signal 216a in which data has been encoded using amplitude keying. This may reduce the instability and improve the efficiency of wireless communications between the transceivers 118a-b.

As another example, the transceiver 118b can determine that there is a gas (e.g., air) positioned in the space 208 between the transceiver 118*b* and transceiver 118*c*. For example, the sensor can include a liquid sensor that can detect the absence of a liquid between the transceivers 118*b-c*. In some examples, wireless communications using quadrature amplitude modulation can have a higher wireless communication efficiency than wireless communications using phase shift keying when transmitted through a gas. The transceiver 118*b* can select the modulation technique with the higher wireless communication efficiency. For example, transceiver 118*b* can select quadrature amplitude modulation over phase-shift keying. The transceiver 118*b* can transmit a wireless signal 216*b* in which data has been encoded using the higher-efficiency modulation technique (e.g., quadrature amplitude modulation).

In some examples, the subterranean formation 212 can include multiple formation layers (e.g., formation layers 120*a-c* of FIG. 1). The formation layers can include different materials and conductivities. The transceiver 118*a* can detect, via a sensor 218 (e.g., which can include an impedance sensor), the conductivity and type of the formation layer. For example, the sensor 218 can detect that the conductivity of a formation layer adjacent or near to the transceiver 118*a* is high. In some examples, a transceiver 118*a* can determine a modulation technique based on a type, conductivity, or both of a formation layer. For example, a formation layer positioned between transceivers 118*a-b* can include a highly conductive material, such as iron or copper. The transceiver 118*a* can select frequency modulation based on the high conductivity of the material. In some examples, wireless communications using frequency modulation can have a higher efficiency than wireless communications using other modulation techniques when transmitted through a highly conductive material.

In some examples, the transceiver 118*a-c* can determine the a property of the fluid 209, the property of the subterranean formation 212, or both based on a wireless communication from another transceiver 118*a-c*. For example, the transceivers 118*a-c* can determine the type and conductivity of the fluid 209 based on changes in amplitudes, frequencies, and phases between multiple wireless communications. In one example, air can be positioned between the transceivers 118*a-b*, causing a wireless communication between the transceivers 118*a-b* to have a high amplitude. Thereafter, if a liquid (e.g., cement) is positioned between the transceivers 118*a-b*, a wireless communication between the transceivers 118*a-b* can have a lower amplitude. The transceiver 118*b* can detect the decrease in amplitude and determine that the liquid, or another material, is positioned between the transceivers 118*a-b*. The transceivers 118*a-b* may additionally be able to determine the type and conductivity of the fluid 209, based on the decrease in amplitude. For example, the transceivers 118*a-b* can consult a lookup table in memory to determine a type, conductivity, or both of the fluid 209 based on the amplitude decrease. The transceivers 118*a-b* can select a modulation technique based on the type, conductivity, and location of the fluid.

Figure 3:
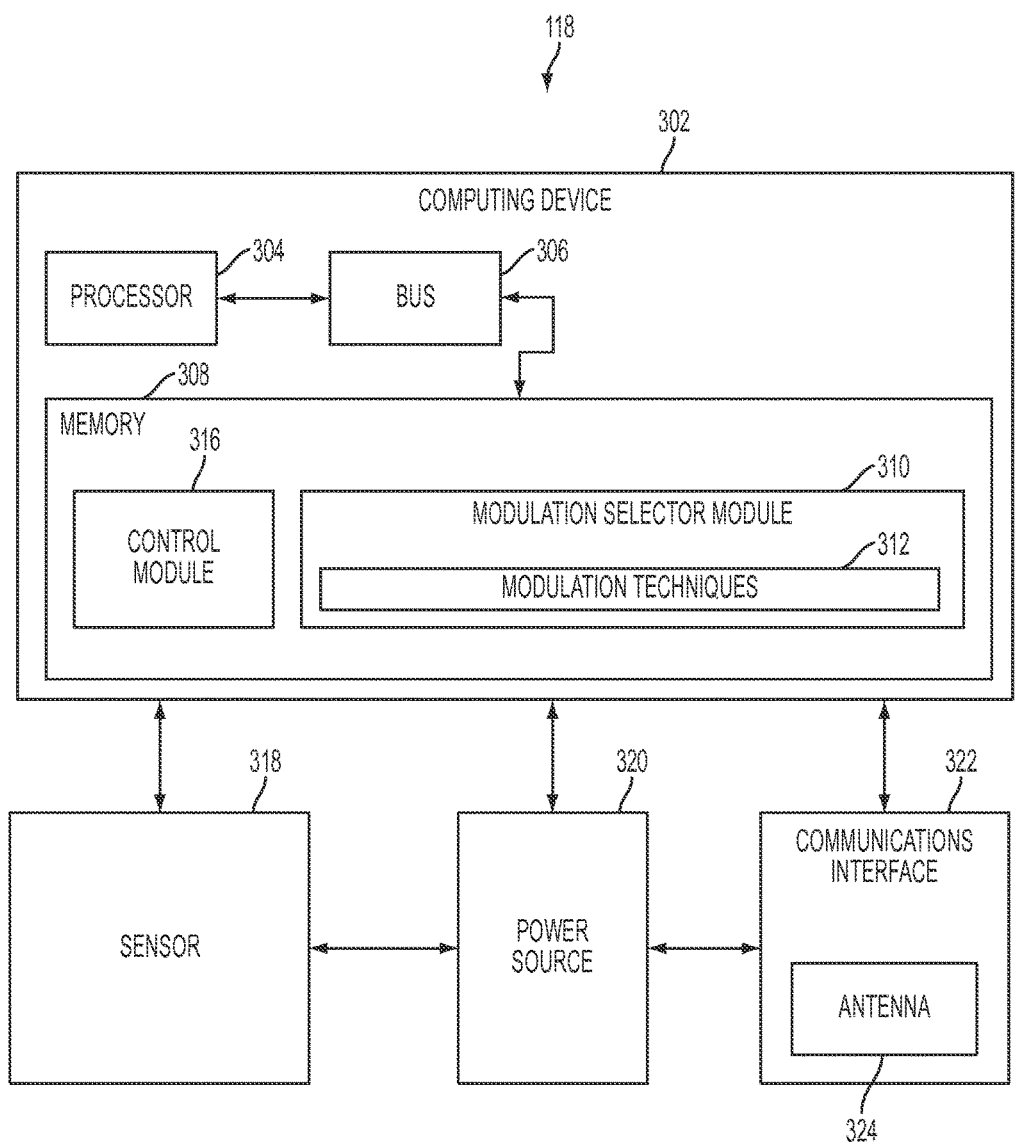
FIG. 3 is a block diagram of an example of a transceiver for implementing downhole communications using selectable modulation techniques.

FIG. 3 is a block diagram of an example of a transceiver for implementing downhole communications using selectable modulation techniques. In some examples, the components shown in FIG. 3 (e.g., the computing device 302, power source 320, and communications interface 322) can be integrated into a single structure. For example, the components can be within a single housing. In other examples, the components shown in FIG. 3 can be distributed (e.g., in separate housings) and in electrical communication with each other.

The transceiver 118 can include a computing device 302. The computing device 302 can include a processor 304, a memory 308, and a bus 306. The processor 304 can execute one or more operations for operating the transceiver 118. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 308 can include various modules 310, 316 for enabling downhole communication using selectable modulation techniques. In some examples, the memory 308 can include a modulation selector module 310. The modulation selector module 310 can include instructions for selecting among multiple stored modulation techniques 312 to use to transmit data. For example, the modulation selector module 310 can include instructions for selecting among amplitude keying, amplitude-shift keying, frequency-shift keying, frequency modulation, phase modulation, phase-shift keying, quadrature amplitude modulation, orthogonal frequency-division multiplexing, and single-sideband modulation.

In some examples, the memory 308 can include a control module 316. The control module 316 can include instructions for receiving data from a sensor 318, communications interface 322, or both and operating the modulation selector module 310 based on the data. For example, the control module 316 can cause modulation selector module 310 to select a modulation technique that uses frequency modulation from among the stored modulation techniques 312.

In some examples, the control module 316 can include instructions for determining a property of the fluid based on data from a sensor 318. For example, the control module 316 can include a lookup table in which data from the sensor 318 is mapped to fluid properties. The control module 316 can include instructions for consulting the lookup table to determine a fluid property based on the data.

In some examples, the control module 316 can include instructions for determining a property of the subterranean formation based on data from a sensor 318. In some examples, the control module 316 can include a lookup table in which data from the sensor 318 is mapped to subterranean formation properties. The control module 316 can include instructions for consulting the lookup table to determine a subterranean formation property based on the data.

In some examples, the control module 316 can include a lookup table in which fluid properties, subterranean formation properties, or both are mapped to modulation techniques. The control module 316 can include instructions for consulting the lookup table to determine a modulation technique based on a fluid property, a subterranean formation property, or both. The control module 316 can cause modulation selector module 310 to select the modulation technique from among stored modulation techniques 312.

In some examples, the control module 316 can include instructions for receiving a wireless communication from another transceiver 118. The control module 316 can include instructions for operating the modulation selector module 310 based a characteristic of the wireless communication. For example, the control module 316 can include instructions for determining, based on the amplitude, frequency, and phase of the wireless communication, a modulation technique from among stored modulation techniques 312, and operating the modulation selector module 310 to select the modulation technique among the available modulation techniques 312. In some examples, the control module 316 can include a lookup table in which the characteristics of a wireless communication are mapped to modulation techniques, fluid properties, subterranean formation properties, or any combination of these. The control module 316 can include instructions for consulting the lookup table to determine a modulation technique, a fluid property, a subterranean formation property, or any combination of these based on the characteristics of the wireless communication.

The transceiver 118 can include a power source 320. The power source 320 can be in electrical communication with the computing device 302, the communications interface 322, and the sensor 318. In some examples, the power source 320 can include a battery (e.g. for powering the transceiver 118). In other examples, the transceiver 118 can be coupled to and powered by an electrical cable (e.g., a wireline).

Additionally or alternatively, the power source 320 can include an AC signal generator. The computing device 302 can operate the power source 320 to apply a transmission signal to the antenna 324. For example, the computing device 302 can cause the power source 320 to apply a voltage with a frequency to the antenna 324 to generate a wireless communication. In other examples, the computing device 302, rather than the power source 320, can apply the transmission signal to the antenna 324 to generate the wireless communication.

The transceiver 118 can include a communications interface 322. The communications interface 322 can include or can be coupled to an antenna 324. In some examples, part of the communications interface 322 can be implemented in software. For example, the communications interface 322 can include instructions stored in memory 308.

The communications interface 322 can detect signals from another transceiver 118. In some examples, the communications interface 322 can amplify, filter, demodulate, demultiplex, demodulate, frequency shift, and otherwise manipulate the detected signals. The communications interface 322 can transmit a signal associated with the detected signals to the processor 304. In some examples, the processor 304 can receive and analyze the signal to retrieve data associated with the detected signals.

In some examples, the processor 304 can analyze the data and perform one or more functions. For example, the processor 304 can generate a response based on the data. The processor 304 can cause a response signal associated with the response to be transmitted to the communications interface 322. The communications interface 322 can generate a transmission signal (e.g., via the antenna 324) to communicate the response to another transceiver 118. For example, the communications interface 322 can amplify, filter, modulate, frequency shift, multiplex, and otherwise manipulate the response signal to generate the transmission signal. In some examples, the communications interface 322 can encode data within the response signal using a selected modulation technique to generate the transmission signal. The communications interface 322 can transmit the transmission signal to the antenna 324. The antenna 324 can receive the transmission signal and responsively generate a wireless communication. In this manner, the processor 304 can receive, analyze, and respond to communications from another transceiver 118.

The computing device 302 can include a sensor 318. Examples of the sensor 318 can include pressure sensors, temperature sensors, microphones, accelerometers, depth sensors, resistivity sensors, electromagnetic sensors, vibration sensors, ultrasonic transducers, fluid analyzers or sensors, RFID tags, and RFID readers. The sensor 318 can transmit data to the processor 304 (e.g., for analysis, communication to another transceiver 118, or both). In some examples, the sensor 318 includes the communications interface 322 and the data is associated with a received wireless communication.

Figure 4:
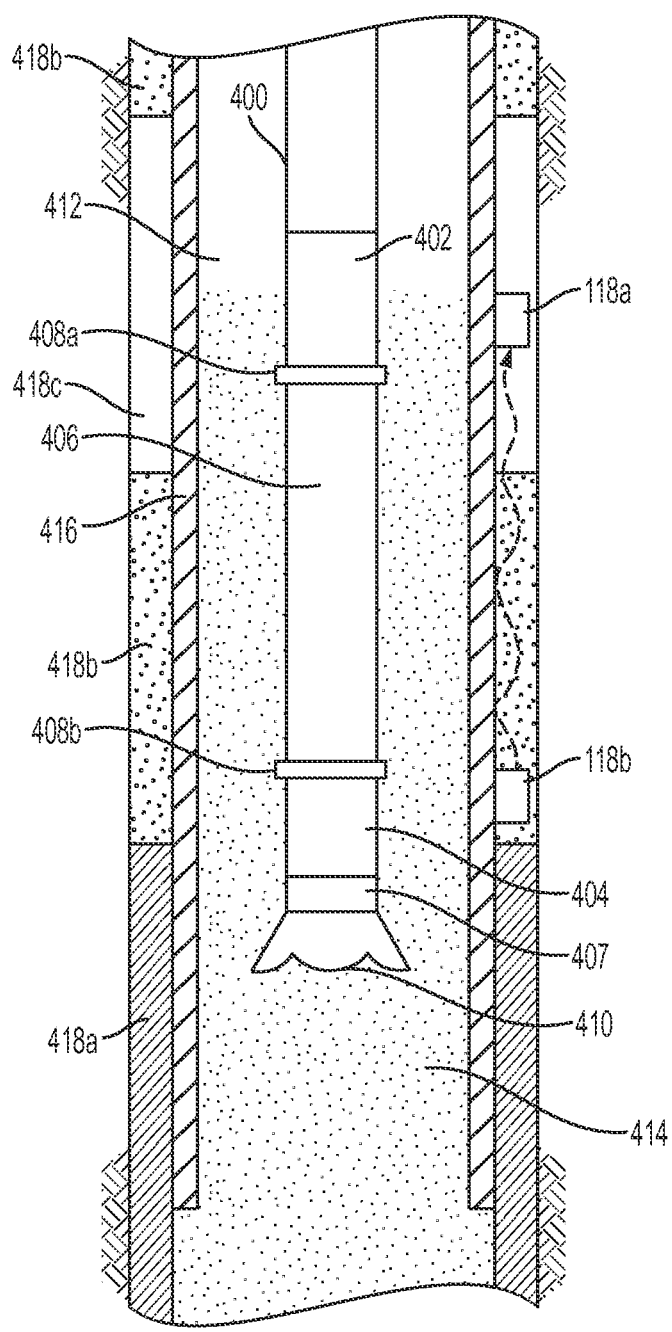
FIG. 4 is a cross-sectional side view of another example of part of a well system that includes a system for downhole communications using selectable modulation techniques.

FIG. 4 is a cross-sectional side view of another example of part of a well system that includes a system for downhole communications using selectable modulation techniques. In this example, the well system includes a wellbore. The wellbore can include a casing string 416. In some examples, a fluid 414 (e.g., mud) can be positioned in the wellbore.

A well tool 400 (e.g., logging-while-drilling tool) can be positioned in the wellbore. The well tool 400 can include various subsystems 402, 404, 406, 407. For example, the well tool 400 can include a subsystem 402 that includes a communication subsystem. The well tool 400 can also include a subsystem 404 that includes a saver subsystem or a rotary steerable system. A tubular section or an intermediate subsystem 406 (e.g., a mud motor or measuring-while-drilling module) can be positioned between the other subsystems 402, 404. In some examples, the well tool 400 can include a drill bit 410 for drilling the wellbore. The drill bit 410 can be coupled to another tubular section or intermediate subsystem 407 (e.g., a measuring-while-drilling module or a rotary steerable system).

The well tool 400 can also include tubular joints 408a, 408b. Tubular joint 408a can prevent a wire from passing between one subsystem 402 and the intermediate subsystem 406. Tubular joint 408b can prevent a wire from passing between the other subsystem 404 and the intermediate subsystem 406. The tubular joints 408a, 408b may make it challenging to communicate data through the well tool 400. It may be desirable to communicate data externally to the well tool 400, for example, using transceivers 118a-b.

The transceivers 118a-b can be positioned internal or external to the casing string 416. The transceivers 118a-b can wirelessly communicate data using one of multiple available modulation techniques. For example, the transceiver 118a can transmit data to transceiver 118b using amplitude-shift keying. In some examples, the wellbore can include multiple different mediums 418a-c (e.g., any combination of liquids and gasses) through which transceivers 118a-b can wirelessly communicate. The transceivers 118a-b can select a modulation technique based on the characteristics of the mediums 418a-c, a characteristic of a subterranean formation out of which the wellbore is drilled, or both. This can allow the transceivers 118a-b to improve the efficiency of wireless communications between the transceivers 118a-c.

Figure 5:
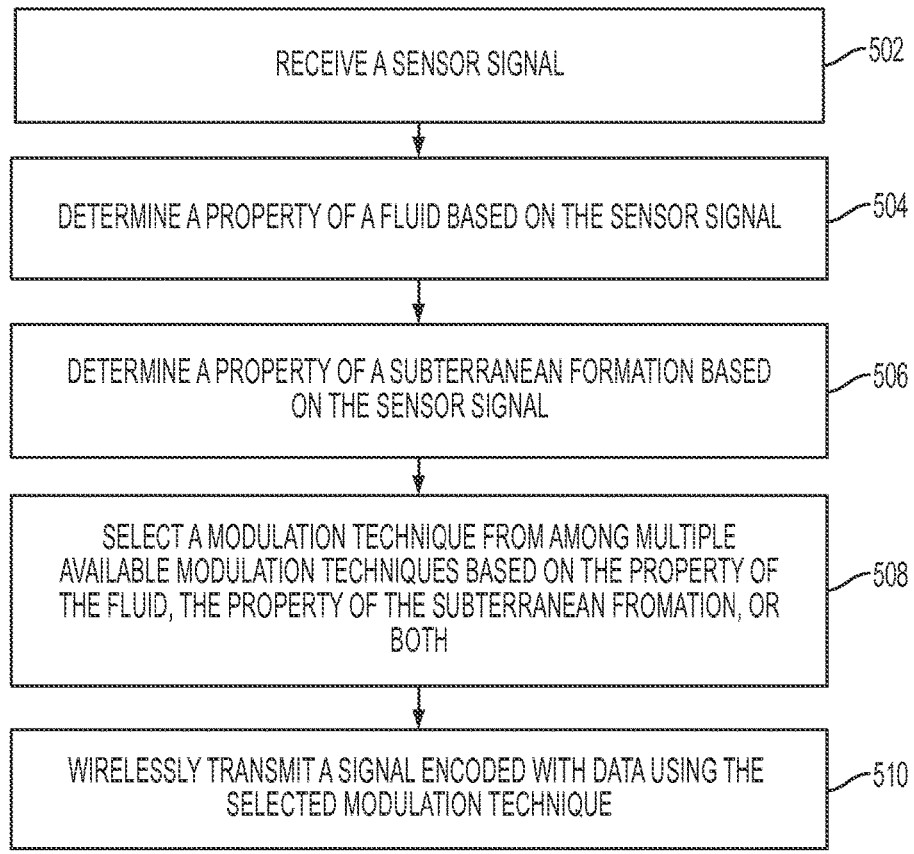
FIG. 5 is a flow chart showing an example of a process for downhole communications using selectable modulation techniques according to one example.

FIG. 5 is a flow chart showing an example of a process for downhole communications using selectable modulation techniques according to one example. Some examples may not include all the steps shown in FIG. 5.

In block 502, a transceiver receives a sensor signal. The sensor signal can be in analog or digital form. A processor within the transceiver can receive the sensor signal from a sensor. The sensor signal can include information associated with a downhole environment. For example, the sensor signal can include or represent a property of fluid in a wellbore, a property of a portion of a subterranean formation, or both.

In block 504, the transceiver determines a property of a fluid based on the sensor signal. For example, as depicted in block 602 of FIG. 6, the transceiver can consult a lookup table stored in memory that maps sensor signal data (or sensor signal characteristics) to fluid properties. The transceiver can use the lookup table to determine the property of the fluid that corresponds to the sensor signal data. For example, the transceiver can use the lookup table to map a positive voltage of the sensor signal to the fluid having a liquid form (e.g., rather than a gaseous form).

In block 506, the transceiver determines a property of a subterranean formation based on the sensor signal. For example, as depicted in block 604 of FIG. 6, the transceiver can consult a lookup table stored in memory that maps sensor signal data (or sensor signal characteristics) to subterranean formation properties. The transceiver can use the lookup table to determine the property of the subterranean formation that corresponds to the sensor signal data. For example, the transceiver can use the lookup table to map a positive voltage of the sensor signal to a high conductivity of the subterranean formation.

In block 508, the transceiver selects a modulation technique from among multiple available modulation techniques. The transceiver can select the modulation technique based on the property of the fluid, the property of the subterranean formation, or both. For example, as depicted in block 606 of FIG. 6, the transceiver can consult a lookup table stored in memory that maps fluid properties, subterranean formation properties, or both to modulation techniques. The transceiver can use the lookup table to determine the modulation technique that corresponds to the fluid properties, subterranean formation properties, or both. For example, the transceiver can use the lookup table to map a fluid having a liquid form to amplitude keying.

In block 510, the transceiver wirelessly transmits a signal encoded with data using the modulation technique selected in block 508. For example, if the modulation technique selected in block 508 is amplitude keying, the transceiver can wirelessly transmit a signal encoded with data using amplitude keying.

Figure 6:
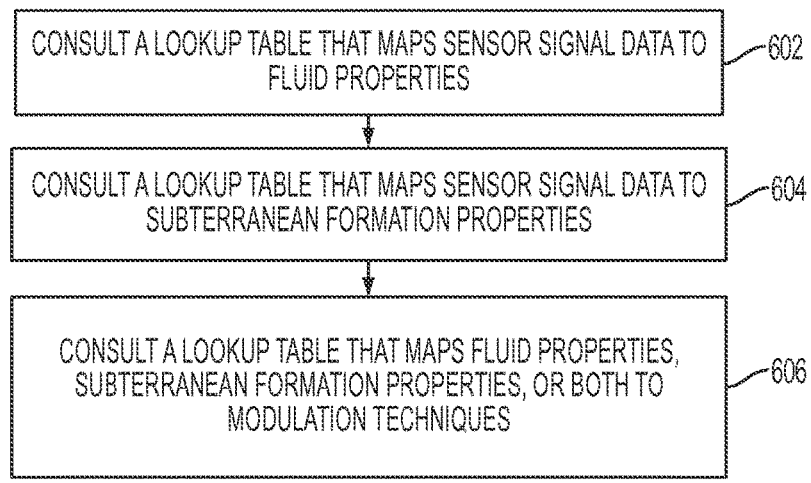
FIG. 6 is a flow chart showing an example of a process for determining a property of a fluid, a property of a subterranean formation, and a modulation technique according to one example.

FIG. 6 is a flow chart showing an example of a process for determining a property of a fluid, a property of a subterranean formation, and a modulation technique according to one example. Any of the steps shown in FIG. 6 can be included additionally or alternatively to any of the steps shown in FIG. 5. Some examples may not include all the steps shown in FIG. 6.

In block 602, the transceiver consults a lookup table that maps sensor signal data to fluid properties. For example, the lookup table can be stored in memory and include one column that has sensor signal data (or characteristics) and another column that has fluid properties. The transceiver (e.g., a processor within the transceiver) can determine the fluid property in the same row as the sensor signal data. The lookup table can alternatively be implemented using any of a number of alternative arrangements of sensor signal data and fluid properties.

In block 604, the transceiver consults a lookup table that maps sensor signal data to subterranean formation properties. For example, the lookup table can be stored in memory and include one column that has sensor signal data (or characteristics) and another column that has subterranean formation properties. The transceiver (e.g., a processor within the transceiver) can determine the subterranean formation property in the same row as the sensor signal data. The lookup table can alternatively be implemented using any of a number of alternative arrangements of sensor signal data and subterranean formation properties.

In block 606, the transceiver consults a lookup table that maps fluid properties, subterranean formation properties, or both to modulation techniques. For example, the lookup table can be stored in memory and include one column that has fluid properties, another column that has subterranean formation properties, and still another column that has modulation techniques. The transceiver (e.g., a processor within the transceiver) can determine the modulation technique in the same row as the fluid property and/or the subterranean formation property. The lookup table can alternatively be implemented using any of a number of alternative arrangements of fluid properties, subterranean formation properties, and modulation techniques.

Figure 7:
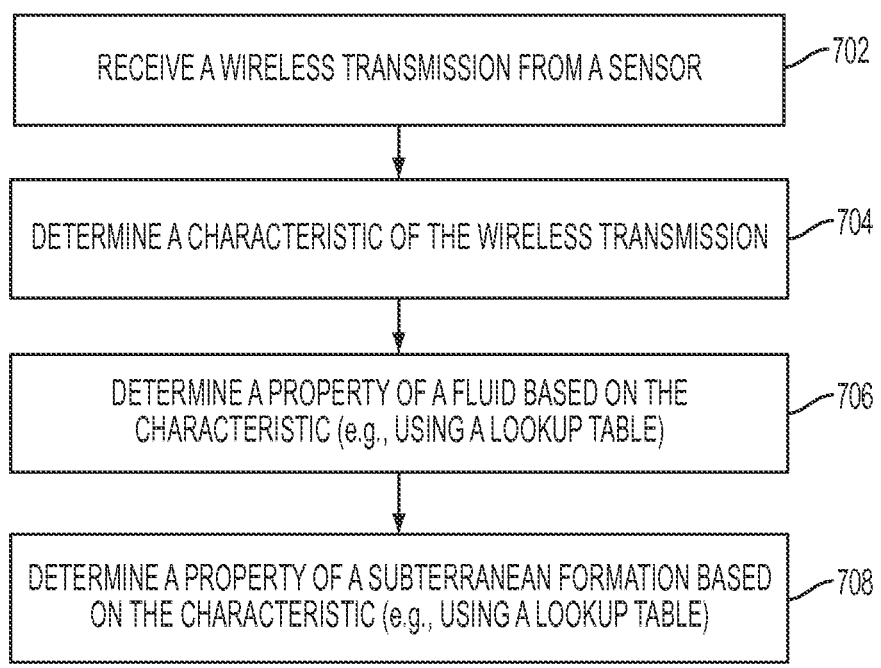
FIG. 7 is a flow chart showing another example of a process for downhole communications using selectable modulation techniques according to one example.

FIG. 7 is a flow chart showing another example of a process for downhole communications using selectable modulation techniques according to one example. Any of the steps shown in FIG. 7 can be included additionally or alternatively to any of the steps shown in FIGS. 5-6. Some examples may not include all the steps shown in FIG. 7.

In block 702, the transceiver receives a wireless transmission from a sensor. In some examples, the sensor includes a communications interface for receiving the wireless transmission.

In block 704, the transceiver determines a characteristic of the wireless transmission. Examples of the characteristic can include an amplitude, phase, frequency, duration, waveform, or any combination of these. In some examples, the transceiver can perform one or more operations to determine the characteristic. For example, the transceiver can perform a Fourier Transform on data associated with the wireless transmission to determine the frequency of the wireless transmission.

In block 706, the transceiver determines a property of a fluid based on the characteristic. For example, the transceiver can consult a lookup table stored in memory that maps wireless communication characteristics to fluid properties. The transceiver can use the lookup table to determine the property of the fluid that corresponds to the characteristic. For example, the transceiver can use the lookup table to map a particular amplitude of the wireless communication to the fluid having a liquid form (e.g., rather than a gaseous form).

In block 708, the transceiver determines a property of a subterranean formation based on the characteristic. For example, the transceiver can consult a lookup table stored in memory that maps wireless communication characteristics to subterranean formation properties. The transceiver can use the lookup table to determine the property of the subterranean formation that corresponds to the characteristic. For example, the transceiver can use the lookup table to map a particular amplitude of the wireless communication to the subterranean formation having a high impedance.

In some aspects, systems and methods for downhole communications using selectable modulation techniques are provided according to one or more of the following examples:

Example #1

A system that is positionable in a wellbore in a subterranean formation can include a first transceiver that is positionable external to a casing string in the wellbore for wirelessly transmitting data. The first transceiver can wirelessly transmit the data using a modulation technique that is selected from multiple modulation techniques based on a fluid property of a fluid in the wellbore and a property of the subterranean formation. The system can also include a second transceiver that is positionable in the wellbore and operable to receive the data.

Example #2

The system of Example #1 may feature the first transceiver including a processing device and a memory device. The memory device can store instructions executable by the processing device for causing the processing device to: select the modulation technique based on the fluid property and the property of the subterranean formation by consulting a lookup table stored in the memory device in which multiple fluid properties and multiple subterranean formation properties are mapped to the multiple modulation techniques.

Example #3

The system of any of Examples #1-2 may feature the modulation technique including amplitude keying, amplitude-shift keying, frequency-shift keying, frequency modulation, phase modulation, phase-shift keying, quadrature amplitude modulation, orthogonal frequency-division multiplexing, or single-sideband modulation.

Example #4

The system of any of Examples #1-3 may feature the fluid property including a first conductivity of the fluid and the property of the subterranean formation including a second conductivity of the subterranean formation.

Example #5

The system of any of Examples #1-4 may feature the first transceiver including a sensor operable to detect the fluid property and the property of the subterranean formation. The sensor can include a resistivity sensor or an electromagnetic sensor.

Example #6

The system of any of Examples #1-5 may feature the first transceiver including a processing device and a memory device. The memory device can store instructions executable by the processing device for causing the processing device to: receive a first sensor signal from a sensor; determine the fluid property based on the first sensor signal by consulting a lookup table in which first data from the first sensor signal is mapped to multiple fluid properties; receive a second sensor signal from the sensor; determine the property of the subterranean formation based on the second sensor signal by consulting another lookup table in which second data from the second sensor signal is mapped to multiple subterranean formation properties; and select the modulation technique from among the multiple modulation techniques based on the fluid property and the property of the subterranean formation.

Example #7

The system of any of Examples #1-6 may feature the fluid property including whether the fluid is positioned between the first transceiver and the second transceiver.

Example #8

The system of any of Examples #1-7 may feature the first transceiver including a processing device and a memory device. The memory device can store instructions executable by the processing device for causing the processing device to: receive a wireless transmission from a sensor comprising a communications device; detect a characteristic of the wireless transmission; and determine the fluid property and the property of the subterranean formation based on the characteristic by consulting a lookup table in which multiple wireless transmission characteristics are mapped to multiple fluid properties and multiple subterranean formation properties.

Example #9

A communication system that is positionable in a wellbore can include a first transceiver that is positionable external to a casing string in the wellbore for wirelessly transmitting signals. The wirelessly transmitted signals can be encoded with data using a modulation technique that is selected from multiple modulation techniques based on a fluid property of a fluid in the wellbore and a property of a subterranean formation. The communication system can also include a second transceiver that is positionable in the wellbore for receiving the data from the first transceiver and relaying the data to a third transceiver.

Example #10

The communication system of Example #9 may feature the first transceiver including a processing device and a memory device. The memory device can store instructions executable by the processing device for causing the processing device to: select the modulation technique based on the fluid property and the property of the subterranean formation by consulting a lookup table stored in the memory device in which multiple fluid properties and multiple subterranean formation properties are mapped to the multiple modulation techniques.

Example #11

The communication system of any of Examples #9-10 may feature the modulation technique including amplitude keying, amplitude-shift keying, frequency-shift keying, frequency modulation, phase modulation, phase-shift keying, quadrature amplitude modulation, orthogonal frequency-division multiplexing, or single-sideband modulation.

Example #12

The communication system of any of Examples #9-11 may feature the fluid property including a conductivity of the fluid and the property of the subterranean formation including another conductivity of the subterranean formation.

Example #13

The communication system of any of Examples #9-12 may feature the first transceiver including a sensor operable to detect the fluid property and the property of the subterranean formation. The sensor can include a resistivity sensor or an electromagnetic sensor.

Example #14

The communication system of any of Examples #9-13 may feature the first transceiver including a processing device and a memory device. The memory device can store instructions executable by the processing device for causing the processing device to: receive a first sensor signal from a sensor; determine the fluid property based on the first sensor signal by consulting a lookup table in which first data from the first sensor signal is mapped to multiple fluid properties; receive a second sensor signal from the sensor; determine the property of the subterranean formation based on the second sensor signal by consulting another lookup table in which second data from the second sensor signal is mapped to multiple subterranean formation properties; and select the modulation technique from among the multiple modulation techniques based on the fluid property and the property of the subterranean formation.

Example #15

The communication system of any of Examples #9-14 may feature the fluid property including whether the fluid is positioned between the first transceiver and the second transceiver.

Example #16

The communication system of any of Examples #9-15 may feature the first transceiver including a processing device and a memory device. The memory device can store instructions executable by the processing device for causing the processing device to: receive a wireless transmission from a sensor comprising a communications device; detect a characteristic of the wireless transmission; and determine the fluid property and the property of the subterranean formation based on the characteristic by consulting a lookup table in which multiple wireless transmission characteristics are mapped to multiple fluid properties and multiple subterranean formation properties.

Example #17

A method can include receiving, by a transceiver that is external to a casing string, a sensor signal from a sensor operable to detect a fluid property of a fluid in a wellbore and a property of a subterranean formation. The method can also include determining the fluid property based on the sensor signal; and determining the property of the subterranean formation based on the sensor signal. The method can further include selecting a modulation technique from multiple modulation techniques based on the fluid property and the property of the subterranean formation. The method can also include wirelessly transmitting a signal that is encoded with data using the modulation technique.

Example #18

The method of Example #17 may feature determining the fluid property based on the sensor signal including consulting a first lookup table in which first data from the sensor signal is mapped to multiple fluid properties. The method can also feature determining the property of the subterranean formation based on the sensor signal including consulting a second lookup table in which second data from the sensor signal is mapped to multiple subterranean formation properties. The method can additionally feature selecting the modulation technique based on the fluid property and the property of the subterranean formation including consulting a third lookup table in which the multiple fluid properties and the multiple subterranean formation properties are mapped to the multiple modulation techniques.

Example #19

The method of any of Examples #17-18 may feature determining a first conductivity of the fluid based on the sensor signal, the fluid property being the first conductivity. The method can also feature determining a second conductivity of the subterranean formation based on the sensor signal, the property of the subterranean formation being the second conductivity.

Example #20

The method of any of Examples #17-19 may feature receiving a wireless transmission from the sensor, the sensor comprising a communications device. The method may also feature detecting a characteristic of the wireless transmission. The method may further feature determining the fluid property and the property of the subterranean formation based on the characteristic by consulting a lookup table in which multiple wireless transmission characteristics are mapped to multiple fluid properties and multiple subterranean formation properties.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system that is positionable in a wellbore in a subterranean formation, the system comprising:
   a first transceiver that is positionable external to a casing string in the wellbore for wirelessly transmitting data using a modulation technique, wherein the first transceiver comprises:
   a processing device; and
   a memory device in which instructions executable by the processing device are stored for causing the processing device to:
   select the modulation technique based on a fluid property of a fluid in the wellbore and a property of the subterranean formation by consulting a lookup table stored in the memory device in which a plurality of fluid properties and a plurality of subterranean formation properties are mapped to a plurality of modulation techniques; and a second transceiver that is positionable in the wellbore and operable to receive the data.

2. The system of claim 1, wherein the modulation technique comprises amplitude keying, amplitude-shift keying, frequency-shift keying, frequency modulation, phase modulation, phase-shift keying, quadrature amplitude modulation, orthogonal frequency-division multiplexing, or single-sideband modulation.

3. The system of claim 1, wherein the fluid property comprises a first conductivity of the fluid and the property of the subterranean formation comprises a second conductivity of the subterranean formation.

4. The system of claim 1, wherein the first transceiver comprises a sensor operable to detect the fluid property and the property of the subterranean formation, the sensor comprising a resistivity sensor or an electromagnetic sensor.

5. The system of claim 4, wherein the memory device further includes instructions that are executable by the processing device for causing the processing device to:
receive a first sensor signal from the sensor;
determine the fluid property based on the first sensor signal by consulting a database in which first data from the first sensor signal is mapped to a plurality of fluid properties;
receive a second sensor signal from the sensor;
determine the property of the subterranean formation based on the second sensor signal by consulting another database in which second data from the second sensor signal is mapped to a plurality of subterranean formation properties; and
select the modulation technique from among the plurality of modulation techniques based on the fluid property and the property of the subterranean formation.

6. The system of claim 4, wherein the fluid property comprises whether the fluid is positioned between the first transceiver and the second transceiver.

7. The system of claim 1, wherein the memory device further includes instructions that are executable by the processing device for causing the processing device to:
receive a wireless transmission from a sensor comprising a communications device;
detect a characteristic of the wireless transmission; and
determine the fluid property and the property of the subterranean formation based on the characteristic by consulting a database in which a plurality of wireless transmission characteristics are mapped to a plurality of fluid properties and a plurality of subterranean formation properties.

8. A communication system that is positionable in a wellbore, the communication system comprising:
a first transceiver that is positionable external to a casing string in the wellbore for wirelessly transmitting signals that are encoded with data using a modulation technique, wherein the first transceiver comprises:
a processing device; and
a memory device in which instructions executable by the processing device are stored for causing the processing device to:
select the modulation technique based on a fluid property of a fluid in the wellbore and a property of a subterranean formation by consulting a lookup table stored in the memory device in which a plurality of fluid properties and a plurality of subterranean formation properties are mapped to a plurality of modulation techniques; and a second transceiver that is positionable in the wellbore for receiving the data from the first transceiver and relaying the data to a third transceiver.

9. The communication system of claim 8, wherein the modulation technique comprises amplitude keying, amplitude-shift keying, frequency-shift keying, frequency modulation, phase modulation, phase-shift keying, quadrature amplitude modulation, orthogonal frequency-division multiplexing, or single-sideband modulation.

10. The communication system of claim 8, wherein the fluid property comprises a conductivity of the fluid and the property of the subterranean formation comprises another conductivity of the subterranean formation.

11. The communication system of claim 8, wherein the first transceiver comprises a sensor operable to detect the fluid property and the property of the subterranean formation, and wherein the sensor comprises a resistivity sensor or an electromagnetic sensor.

12. The communication system of claim 11, wherein the memory device further includes instructions that are executable by the processing device for causing the processing device to:
receive a first sensor signal from the sensor;
determine the fluid property based on the first sensor signal by consulting a database in which first data from the first sensor signal is mapped to a plurality of fluid properties;
receive a second sensor signal from the sensor;
determine the property of the subterranean formation based on the second sensor signal by consulting another database in which second data from the second sensor signal is mapped to a plurality of subterranean formation properties; and
select the modulation technique from among the plurality of modulation techniques based on the fluid property and the property of the subterranean formation.

13. The communication system of claim 11, wherein the fluid property comprises whether the fluid is positioned between the first transceiver and the second transceiver.

14. The communication system of claim 8, wherein the memory device further includes instructions that are executable by the processing device for causing the processing device to:
receive a wireless transmission from a sensor comprising a communications device;
detect a characteristic of the wireless transmission; and
determine the fluid property and the property of the subterranean formation based on the characteristic by consulting a database in which a plurality of wireless transmission characteristics are mapped to a plurality of fluid properties and a plurality of subterranean formation properties.

15. A method comprising:
receiving, by a transceiver that is external to a casing string, a sensor signal from a sensor operable to detect a fluid property of a fluid in a wellbore and a property of a subterranean formation;
determining, by the transceiver, the fluid property based on the sensor signal;
determining, by the transceiver, the property of the subterranean formation based on the sensor signal;

selecting, by the transceiver, a modulation technique from a plurality of modulation techniques based on the fluid property and the property of the subterranean formation; and wirelessly transmitting, by the transceiver, a signal that is encoded with data using the modulation technique.

16. The method of claim 15, wherein determining the fluid property based on the sensor signal comprises consulting a first lookup table in which first data from the sensor signal is mapped to a plurality of fluid properties;

wherein determining the property of the subterranean formation based on the sensor signal comprises consulting a second lookup table in which second data from the sensor signal is mapped to a plurality of subterranean formation properties; and wherein selecting the modulation technique based on the fluid property and the property of the subterranean formation comprises consulting a third lookup table in which the plurality of fluid properties and the plurality of subterranean formation properties are mapped to the plurality of modulation techniques.

17. The method of claim 15, further comprising:

determining a first conductivity of the fluid based on the sensor signal, the fluid property being the first conductivity; and determining a second conductivity of the subterranean formation based on the sensor signal, the property of the subterranean formation being the second conductivity.

18. The method of claim 15, further comprising:

receiving a wireless transmission from the sensor, the sensor comprising a communications device;

detecting a characteristic of the wireless transmission; and determining the fluid property and the property of the subterranean formation based on the characteristic by consulting a database in which a plurality of wireless transmission characteristics are mapped to a plurality of fluid properties and a plurality of subterranean formation properties.

* * * * *